Patented Feb. 19, 1946

2,395,372

UNITED STATES PATENT OFFICE 2,395,372

BROMINATED THYROID PRODUCT

Edgar A. Ferguson, Jr., Brooklyn, N. Y., assignor to Van Patten Pharmaceutical Company, Chicago, Ill., a corporation of Illinois No Drawing. Application July 28, 1942, Serial No. 452,644

2 Claims. (Cl. 167—76)

This invention relates to brominated thyroid products and processes of producing the same, and it comprises, as new materials, products made by subjecting a thyroid powder to the action of bromine; it further comprises process wherein ordinary thyroid substances, such as those conforming to the standards of the U. S. Pharmacopeia are treated with free bromine, advantageously in the presence of a liquid vehicle, and the resulting bromine-containing thyroid material recovered.

The ordinary thyroid products used in the treatment of thyroid-deficiency diseases are derived from the thyroid glands of animals by the careful dissection, drying, and standardization to an iodine content of 0.2 percent. The iodine content of the dried gland is approximately 0.4 percent to 0.6 percent and inert materials, such as lactose, are mixed with the dried material to reduce the iodine content of the mixture to about 0.2 percent. Such thyroid preparations are administered in dosages depending upon the nature of the case. The average dose is probably about three grains or less.

Thyroid products are frequently used to combat excessive weight. But they have many objectionable physiological effects. After administration patients complain of increased pulse rate and palpitation, sweating and weakness, nervousness, muscle tremors, emotional upsets, and insomnia. Naturally not all of these manifestations are present in each instance. Medication is usually discontinued when one or more of these effects become noticeable.

I have sought ways by which thyroid material can be modified so as to lessen its undesirable manifestations on the patient while retaining its desirable characteristics. And as a result of prolonged experimentation I have discovered that such thyroid materials can be brominated and that the brominated products display much less tendency to develop unwanted manifestations of the character described above.

I shall first describe how the products of the present invention are made.

An ordinary thyroid powder, containing about 0.4 to 0.6 percent of iodine, and conforming to U. S. P. standards except for it being undiluted with an inert material is subjected to the action of bromine, advantageously in the presence of a liquid vehicle such as water or alcohol. After bromination is completed the brominated product is recovered and standardized, by the addition thereto of inert materials, to the U. S. P. iodine content of about 0.2 percent. This material will contain chemically bound bromine as well, as I shall presently describe.

Thus 100 grams of thyroid powder made by drying the thyroid gland in the usual way are admixed with about 400 cubic centimeters of ordinary 95 percent ethyl alcohol and 6 grams of bromine. This mixture is allowed to stand overnight at room temperature, approximately 18° C. Thereafter the mixture is filtered, and the solid material allowed to dry at room temperature. It has an iodine content substantially unchanged from the original starting material, and a bromine content of 0.2 to about 1.5 percent.

The above is a general method for preparing the brominated thyroid products of the present invention. Many variations may be made. Instead of using 95 percent alcohol I can use alcohol diluted to 50 percent strength. I can use methyl alcohol as well as ethyl. The bromination will take place in the presence of water alone as the liquid vehicle. Indeed no vehicle at all is actually required but since it is desirable to agitate the mixture during bromination, the use of a vehicle such as water or alcohol simplifies handling the materials. The ratio of bromine to gland material is not at all critical. The amount of bromine chemically reacting with the thyroid material is very small, but a reasonable excess of bromine is desirable so that the reaction is promoted. I prefer to use at least two parts by weight of bromine for each 100 parts by weight of dry powdered thyroid so as to facilitate the bromination. Much more bromine can be used.

When a vehicle is used its quantity is not critical. It simply functions as a vehicle for the reactants, although some of the bromine may react with the alcohol or water present to form side products having no effect at all on the main bromination process. The brominated product is readily recovered. It remains insoluble in the vehicle and can be separated therefrom by decantation or filtering as desired. If the amount of vehicle used is quite small then, after the reaction is over, the solvent vehicle can be allowed to evaporate, although this is wasteful. The solid product is best dried at room temperature to avoid any possibility of decomposition. I need only spread it out on trays and permit the adhering liquids to evaporate. Obviously warm currents of air can also be used.

The reaction is complete for all practical purposes in a few hours. On a small scale ten or twelve hours is sufficient. On a larger scale I can allow the mixture or thyroid powder, bromine, and vehicle to stand for 48 hours or even longer.

After drying, the brominated product is ground to a powder and admixed with suitable inert materials to standardize its content of iodine and bromine. It is then administered as circumstances may direct.

The content of combined bromine seems not to be markedly critical. It may vary from about 0.2 to 1.5 percent or higher in the brominated material as recovered in my process, and to about half this in the material standardized with an inert diluent. Since an excess of bromine is used in the bromination, the thyroid powder therefore takes up all it can chemically combine with. Since the composition of the thyroid powder may vary from lot to lot the percent of chemically combined bromine naturally may also vary. The brominated material is a brown, amorphous powder having a sweetish aldehyde odor in contrast with that of U. S. P. thyroid powder which is yellowish and has a slight characteristic odor different from the brominated product. In each instance the iodine content is unchanged.

I am unable to explain what changes have actually taken place when the thyroid material is brominated, but many clinical tests and observations have demonstrated that the brominated materials of my invention reduce the so-called toxic manifestations hitherto associated with ordinary U. S. P. thyroid materials. Moreover, these clinical tests have demonstrated that higher weight reduction, and lesser pulse rate increase can be obtained when the brominated products instead of the ordinary U. S. P. thyroid preparations are used.

Having thus described my invention, what I claim is:

1. As a composition of matter, a glandular thyroid product for use in human administration to combat excessive weight and being effective to lessen undesirable physiological effects produced by ordinary glandular thyroid administration, said product consisting of brominated, previously isolated, detissued, defatted, desiccated and powdered thyroid glandular material.

2. As a composition of matter, a glandular thyroid product for use in human administration to combat excessive weight and being effective to lessen undesirable physiological effects produced by ordinary glandular thyroid administration, said product consisting of brominated, previously isolated, detissued, defatted, desiccated and powdered thyroid glandular material containing about 0.2 to 1.5% of added bromine.

EDGAR A. FERGUSON, JR.